Nov. 8, 1949  E. F. STOVER  2,487,679
INTEGRATING METER
Filed Feb. 8, 1946
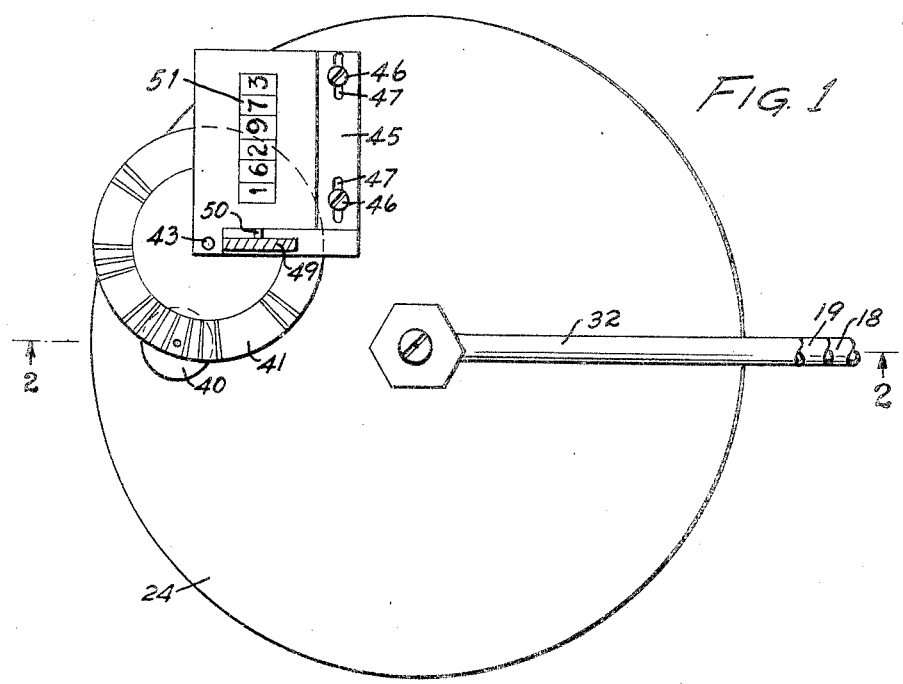
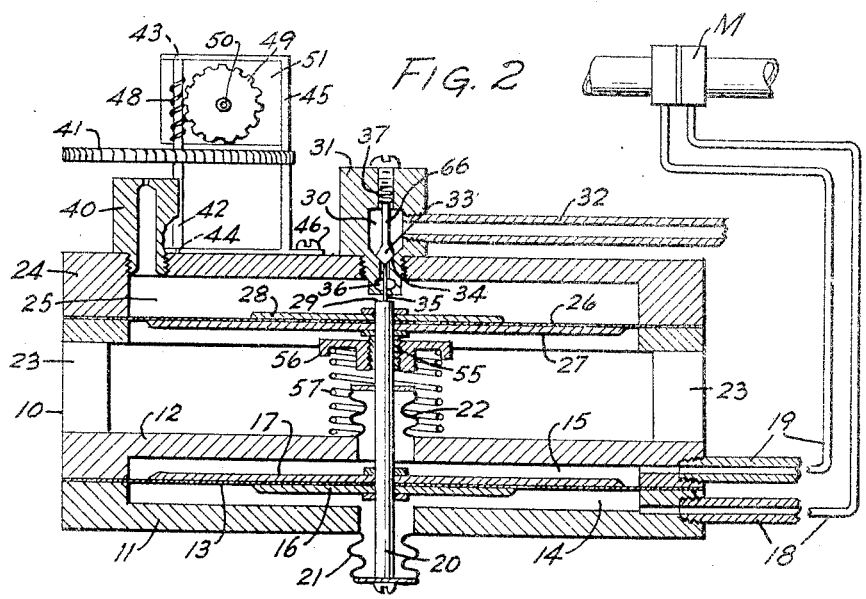
INVENTOR.
EMORY FRANK STOVER
BY
ATTORNEY Patented Nov. 8, 1949

2,487,679

UNITED STATES PATENT OFFICE 2,487,679

INTEGRATING METER

Emory Frank Stover, Wynnewood, Pa.

Application February 8, 1946, Serial No. 646,436

9 Claims. (Cl. 73—206)

This invention relates to integrating meters and more particularly to meters for continuously integrating variable quantities, such as a variable pressure as a measure of flow or as a measure of distance travelled in a fluid medium.

This invention relates particularly to apparatus for integrating, over any period of time, the flow through a conduit fitted with a venturi, an orifice, a flow nozzle or a Pitot tube, without requiring the use of any square root mechanism.

The apparatus of the present invention is also useful for integration of distance travelled by a vessel provided with a Pitot tube movable with the vessel through the surrounding or supporting medium.

The apparatus of the present invention contemplates the utilization of a separate source of fluid under pressure, with the pressure from the source controlled by a variable to be integrated.

The nature and characteristic features of the invention will be more readily understood from the following description, taken in connection with the accompanying drawings forming part hereof, in which:

Fig. 1 is a top plan view of an integrating meter in accordance with the present invention; and Fig. 2 is a vertical section view taken approximately on line 2—2 of Fig. 1.

It should, of course, be understood that the description and drawings herein are illustrative merely, and that various modifications and changes may be made in the structure disclosed without departing from the spirit of the invention.

Referring more particularly to the drawings, in the particular embodiment of the invention illustrated, a main frame 10 is provided. The frame 10 preferably includes a pair of spaced outer and inner wall plates 11 and 12 with a diaphragm 13 interposed therebetween to provide pressure chambers 14 and 15. The diaphragm 13 may have supporting plates 16 and 17 on opposite sides thereof. The pressure chamber 14 is preferably connected by a fluid connection 18 to the higher pressure side of a primary metering device M such as a venturi, orifice, flow nozzle, Pitot tube, or the like, and the chamber 15 is preferably connected by a fluid connection 19 with the lower pressure side of the primary metering device M. The differential pressure from the primary metering device M is thus effective on the diaphragm 13.

The diaphragm 13 has a rod 20 rigidly connected thereto for movement therewith. The rod 20 may extend through the outer wall plate 11 and have its outer end sealed by a sealing bellows 21 connected to the rod 20. The bellows 21 is secured at its inner end, in fluid tight relationship, to the end wall plate 11. The rod 20 also extends through a sealing bellows 22, the bellows 22 being connected at one end to the rod 20 and at the other end to the inner end plate 12, in fluid tight relationship.

The frame 10 also includes a spacer section 23, on which an upper end plate 24 is mounted. The end plate 24 has a chamber 25 therein which is closed on the lower side by a diaphragm 26. The diaphragm 26 may have supporting plates 27 and 28 on opposite sides thereof. One side of the diaphragm 26 is in communication with the atmosphere and the other is subject to the pressure in the pressure chamber 25.

The rod 20 is connected to the diaphragm 26, extends therethrough, and has a flat end portion 29 for purposes to be explained.

The rod 20 has a bushing 55 secured thereto and is threaded on the exterior thereof for the reception of an adjustable collar 56. A spring 57 is adapted to be interposed between the collar 56 and the inner end plate 12, for purposes to be explained.

Aligned with the rod 20, a pilot valve chamber 30 is provided in a body 31. A fluid connection 32 is provided in communication therewith, the fluid connection 32 being connected to a suitable source of fluid under pressure, such as air. The pilot valve chamber 30 has a pilot valve 33 therein which is adapted to seat on or be spaced with respect to a seat portion 34 in the body 31 and has an actuating stem 35 extending through a fluid delivery opening 36 in communication with the chamber 25. The stem 35 is adapted to be actuated by the flat end 29 of the rod 20 as hereinafter explained. The pilot valve 33 is guided in the body 31 by the stem 35 and by a guide portion 66 against which a light spring 37 may bear.

The end plate 24 has a nozzle 40 mounted thereon in communication with the chamber 25 for the discharge of air therefrom against an anemometer wheel 41. The anemometer wheel 41 may be any preferred type although the vanes or blades, in order to avoid excessive speed of the wheel 41 at maximum flow, are preferably shaped so that a portion of each vane or blade acts as a brake. As a result of experiments with the anemometer blades by applicant, it was noted that with the diagonal vanes of conventional type, the anemometer wheel tended to speed up too rapidly and slow down too slowly in metering variable flow, this resulting in over-indication of the rate. It was thus deemed desirable to make some provision for fluid damping. It was found by using a flat paddle section on the blade, a turbulence was produced with a damping effect, and portions of the fluid at over speeds would pass between the vanes, without energy extraction, and other portions were effective against the leading faces of the paddle sections. The remaining portions of the blades were, of course, curved in a manner to provide for energy extraction to operate the anemometer wheel shaft. The anemometer wheel 41 is mounted on a spindle 42 carried at one end in a bearing 43 and at the other end in a bearing 44 mounted in an anemometer frame 45.

The anemometer frame 45 is adapted to be adjustably mounted on the end plate 24 by screws 46, slots 47 being provided for permitting adjustment of the anemometer wheel 41 radially with respect to the nozzle 40. The spindle 42 is provided with a worm gear 48 which meshes with a gear 49 on a counter spindle 50. The counter spindle 50 is adapted to actuate counter mechanism 51 which is also mounted in the anemometer frame 45.

The chamber 25 is made of sufficient size so that the flow of fluid in the chamber 25 to the nozzle 40 is of very low velocity.

The mode of operation will now be explained. The differential pressure from the primary metering device M is effective on the diaphragm 13 through the fluid connections 18 and 19. The force applied on the diaphragm 13 is transmitted by the rod 20. The end portion 29 of the rod 20 positions the pilot valve 33 to admit pressure fluid, supplied to the pilot valve chamber 30 by the fluid connection 32, to the chamber 25. The pressure effective in the chamber 25 acts on the diaphragm 26 in opposition to the force effective on the diaphragm 13. The pressure in the chamber 25 is regulated, by the positioning of the pilot valve 33, to equalize the force transmitted to rod 20 from the diaphragm 13. The pressure in the chamber 25 is thus directly proportional to the differential pressure produced by the primary metering device M.

The fluid is discharged from the chamber 25 through the nozzle 40 and actuates the anemometer wheel 41 which in turn drives the spindle 42 and through the worm 48 and gear 49 actuates the counter shaft 50 for driving the counter 51.

The differential produced by a primary metering device is theoretically proportional to the square of the relative velocity of the fluid and the primary measuring element. This may be expressed as:

$$h = kq^2$$

where $h$ is the differential, $q$ is the velocity, and $k$ is a constant. As heretofore indicated, the pressure $p_c$ in the chamber 25 is proportional to $h$, or:

$$p_c = k_1 h = k_2 q^2$$

The velocity of the jet from the nozzle 40 is proportional to the square root of the pressure in the chamber 25, or:

$$v = k_3 p_c^{1/2}$$

where $v$ is the jet velocity, $p_c$ is the pressure in the chamber 25 and $k_3$ is a constant. From this $$v^2 = k_3^2 p_c = k_4 q^2$$

Extracting the square root of both sides of this equation gives the following equation:

$$v = k_4^{1/2} q = k_5 q$$

With a very low load on the anemometer wheel 41 its speed $s$ follows closely the velocity $v$ of the jet, hence, $$s = k_7 q$$

If the rate of flow $q$ varies over the time $t$, the accumulated count on the counter mechanism 51 represents $\int q \, dt$.

When a jet of compressible fluid issues from a nozzle the velocity rises at a rate slightly higher than $p^{1/2}$ because of the expansion of the gas. If a very wide range of rates of flow is to be integrated, the count at the low values of the flow may be raised so as to provide uniformity over the range by biasing the diaphragm assembly by a small force which is added to the force of the differential pressure. For this purpose the spring 57, bearing on the adjusting collar 56 is effective through the bushing 55 on the rod 20. The spring 57 also supports and carries the dead weight of the stem 20 and the parts connected thereto and movable therewith, including the diaphragms 13 and 26 and the diaphragm plates 16, 17, 27 and 28, when the meter is employed in the position shown. It will be seen, however, that the meter is not limited to use in this specific position.

I claim:

1. In an integrating meter, a primary metering element, a casing having a chamber therein, a fluid pressure responsive member forming a wall of said chamber, a second responsive member connected to said first member for movement therewith and movable responsive to a differential fluid pressure at said primary metering element, a source of pressure fluid, a valve controlled by said pressure responsive members and controlling the supplying of fluid from said source to said chamber, discharge means connected to said chamber for the continuous discharge of fluid therefrom, a driven member actuated by the discharge of fluid from said discharge means, and counting mechanism actuated by said driven member.

2. In an integrating meter, a casing member having a chamber therein, a movable fluid pressure responsive member forming a wall of said chamber, a second casing member, a second fluid pressure responsive member in said second casing member responsive to the application of a differential fluid pressure thereon, a rigid connector for connecting said pressure responsive members for simultaneous movement, a source of pressure fluid, a valve actuated by said connector and controlling the supplying of fluid from said source to said chamber, discharge means connected to said chamber for the continuous discharge of fluid therefrom, a rotatable driven member actuated by the discharge of fluid from said discharge means, and counting mechanism actuated by said driven member.

3. In an integrating meter, a casing having a chamber therein, a fluid pressure responsive member forming a wall of said chamber, a second casing, a second fluid pressure responsive member in said second casing connected to said first member for movement therewith and responsive to the application of a differential fluid pressure thereon, a source of pressure fluid, a valve controlled by said pressure responsive members and controlling the supplying of fluid from said source to said chamber in opposition to the force from said differential pressure, discharge means connected to said chamber for the continuous discharge of fluid therefrom, a rotatable driven member actuated by the discharge of fluid from said discharge means, and counting mechanism actuated by said driven member.

4. In an integrating meter, a casing having a chamber therein, an expansible chamber member forming a wall of said chamber, a second casing, a second expansible chamber member in said second casing connected to said first expansible member for movement therewith, fluid connections in communication with opposite sides of said second expansible chamber member for applying differential pressure thereon, a source of pressure fluid, a valve controlled by said expansible chamber members for controlling the supplying of fluid from said source to said first chamber for equalizing the force applied on said second expansible chamber member, a nozzle connected to said first chamber for the continuous discharge of fluid therefrom, a rotatable member actuated by the discharge of fluid from said nozzle, counting mechanism actuated by said rotatable member, and adjustable means for applying a force against said first expansible chamber member.

5. In an integrating meter, a casing having a chamber therein, an expansible chamber member forming a wall of said chamber, a second casing, a second expansible chamber member in said second casing connected to said first expansible member for movement therewith, a primary metering device, fluid connections in communication with opposite sides of said second expansible chamber member for applying differential pressure thereon from said metering device, a source of pressure fluid, a valve controlled by said expansible chamber members for controlling the supplying of fluid from said source to said first chamber for equalizing the force applied on said second expansible chamber member, a nozzle connected to said first chamber for the discharge of fluid therefrom at a velocity proportional to the square root of the differential pressure on said second member and means including counting mechanism actuated by the discharge of fluid from said discharge member.

6. In an integrating meter, a casing having a chamber therein, a fluid pressure responsive member forming a wall of said chamber, a second casing, a second fluid pressure responsive member in said second casing connected to said first member for movement therewith, fluid connections in communication with opposite sides of said second member for the application of differential fluid pressure thereon, a source of pressure fluid, a valve controlled by said pressure responsive members and controlling the supplying of fluid from said source to said chamber for equalizing the force applied on said second responsive member, a nozzle connected to said chamber for the discharge of fluid therefrom at a velocity proportional to the square root of the differential applied on said second member, means including counting mechanism actuated by the discharge of fluid from said nozzle, and adjustable resilient means for applying on said first fluid pressure responsive member a force supplementing the effect of said differential pressure.

7. In an integrating meter, a source of pressure fluid, a fluid pressure responsive member responsive to a variable condition for controlling the pressure of the fluid from said source of pressure fluid applied on said responsive member, a fluid discharge member for delivery of fluid applied on said responsive member at a velocity proportional to the square root of the effect of said variable, counting mechanism actuated by the fluid discharged from said discharge member, and adjustable means for varying the position of said counting mechanism with respect to said discharge member.

8. In an integrating meter, a source of pressure fluid, a chamber, means responsive to a variable quantity to be integrated for controlling the pressure of the fluid from said source to said chamber, discharge means connected to said chamber for the discharge of fluid therefrom, counter means including an anemometer wheel actuated by the discharge from said discharge means, and adjustable mounting means for said anemometer wheel for permitting radial adjustment of the position of said wheel in fixed relationship with respect to said discharge means.

9. In an integrating meter, a source of pressure fluid, a chamber, means responsive to a variable quantity to be integrated for controlling the pressure of the fluid from said source to said chamber, a nozzle connected to said chamber for the continuous discharge of fluid therefrom, an anemometer wheel actuated by the discharge from said nozzle and adjustable mounting means for said anemometer wheel for permitting adjustment of the position of said wheel radially in fixed relationship with respect to said nozzle.

EMORY FRANK STOVER.

REFERENCES CITED

The following references are of record in the file of this patent:

UNITED STATES PATENTS

| Number | Name | Date |
|---|---|---|
| Re. 14,206 | Gibson | Oct. 24, 1916 |
| 1,129,073 | Connet | Feb. 23, 1915 |
| 1,191,415 | Gibson | July 18, 1916 |
| 1,381,139 | Smoot | June 14, 1921 |
| 1,419,876 | Mapelsden et al. | June 13, 1922 |
| 1,619,416 | Graemiger | Mar. 1, 1927 |
| 1,939,509 | McClelland | Dec. 12, 1933 |
| 2,100,495 | Stevenson | Nov. 30, 1937 |